Nov. 28, 1967 — E. JONES — 3,355,021
INLINE REFRIGERANT FILTER ASSEMBLY HAVING
A BY-PASS VALVE THEREIN
Filed Jan. 27, 1965
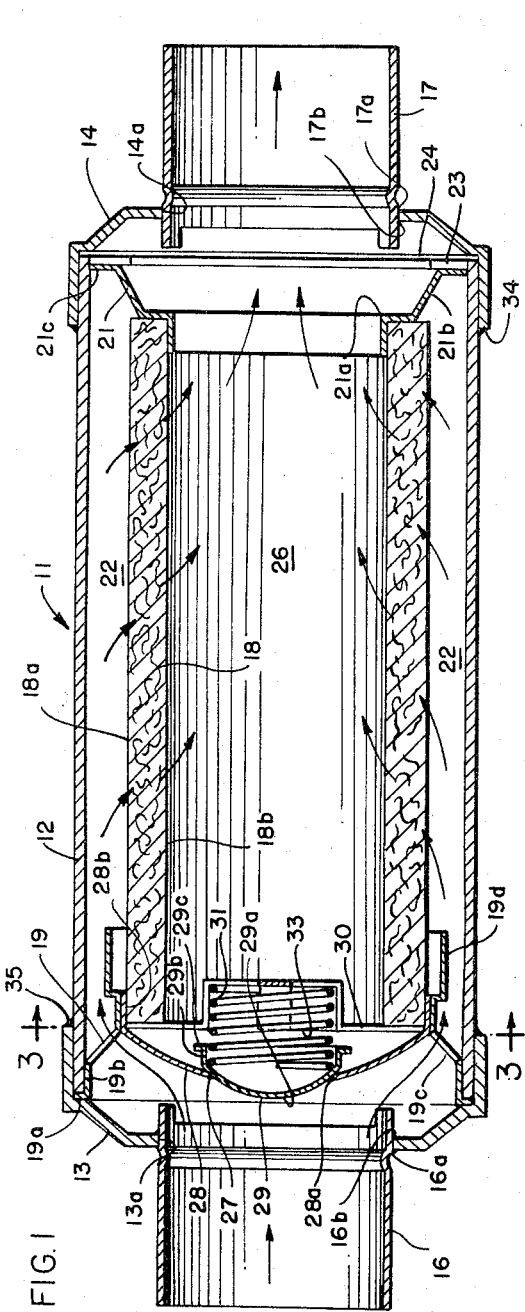
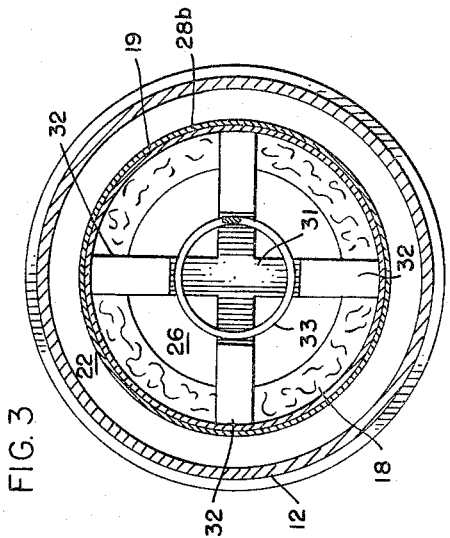
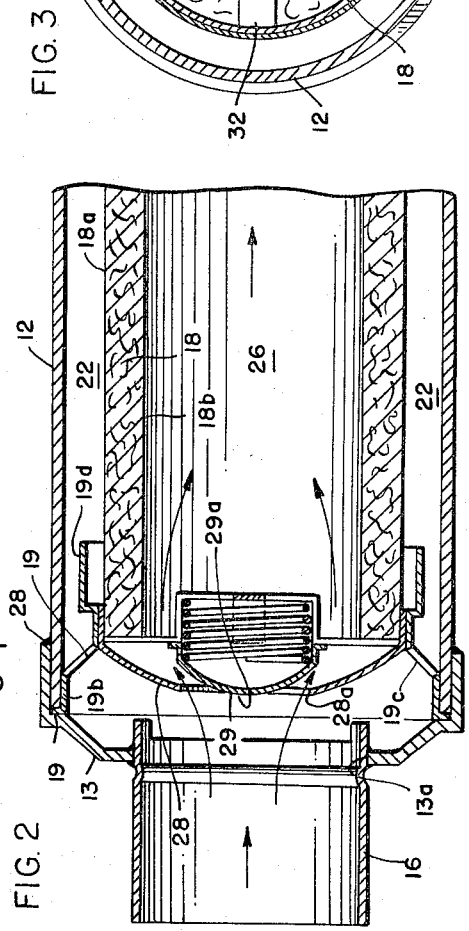
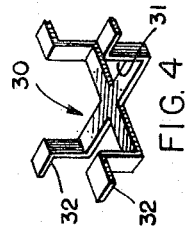
INVENTOR:
EVAN JONES
BY
Greist, Lockwood, Greenwalt & Dewey
ATT'YS United States Patent Office 3,355,021
Patented Nov. 28, 1967

3,355,021
INLINE REFRIGERANT FILTER ASSEMBLY
HAVING A BY-PASS VALVE THEREIN
Evan Jones, Evanston, Ill., assignor to Henry Valve
Company, Melrose Park, Ill., a corporation of Illinois
Filed Jan. 27, 1965, Ser. No. 428,339
2 Claims. (Cl. 210—130)

The present invention relates to refrigerant purification assemblies and, more particularly, to a new and improved suction line filter equipped with a novel by-pass pressure relief means for diverting the flow of refrigerant therethrough when the filter becomes plugged or clogged, which by-pass pressure relief means operates without any movement of the filter element itself.

Filter units, positioned on the suction side of the compressor in a refrigeration system, have commonly been employed to remove dirt and other contaminants from the refrigerant in order to prevent these contaminants from damaging the various system components. In this connection, it has been found that increased flow resistance through the filter, due to the build up of particles in the filter element, can result in overloading of the compressor and, in extreme cases, produce motor burnout.

Efforts to overcome this problem have involved the use of by-pass relief devices which, when the filter becomes plugged or clogged, provide an alternative path for the refrigerant. Heretofore, these devices have not been entirely satisfactory. One problem associated with conventional by-pass equipped suction line filters has involved the transmission of filtered sludge and contaminants into the compressor when the by-pass relief device of the filter is activated. This is generally brought about by the fact that these conventional filter units usually require that the filter element itself move in order to provide the alternative routing of the refrigerant.

Another problem associated with the prior art by-pass equipped suction line filters has involved the non-streamline flow of refrigerant. This non-streamline or turbulent flow results in a reduced capacity for the filter and, in addition, reduces the overall efficiency of the refrigeration system.

It is, therefore, a principal object of the present invention to provide an improved suction line filter adapted to provide a by-pass routing of refrigerant without dislodging any sludge or other contaminants from the filter element.

Another object of the present invention is to provide a suction line filter assembly adapted to be positioned immediately adjacent the compressor, wherein the by-pass pressure relief means operates independently of any movement of the filter element.

A further object of the present invention is to provide a by-pass equipped suction line filter assembly wherein the filter element is fixedly positioned in the filter assembly casing.

Another and important object of the present invention is to provide an improved by-pass suction line filter wherein streamline flow of refrigerant is provided in both the filtered and by-pass flow paths.

A yet further object of the present invention is to provide an improved suction line filter for refrigerant systems which is equipped with a heat shield device that protects the filter element from high temperatures, thereby enabling the hermetic sealing of an end cap, such as by soldering, to provide a completely sealed and leakproof construction.

Other and further objects of the present invention will be apparent from the following description of the drawing wherein:

FIGURE 1 is a longitudinal, vertical, sectional view of a suction line filter constructed in accordance with the present invention and illustrating the by-pass relief means in the closed position;

FIGURE 2 is a fragmentary sectional view, similar to FIGURE 1, illustrating the by-pass relief means in the open position;

FIGURE 3 is a sectional view taken along the line 3—3 of FIGURE 1; and

FIGURE 4 is a perspective view of the spring retainer component of the suction line filter illustrated in FIGURES 1–3.

Referring to the drawing and with particular reference to FIGURES 1 and 2, the numeral 11 generally designates a by-pass suction line filter assembly embodying principles of the present invention and having a cylindrical sleeve-like casing or housing 12 to which an inlet cover plate 13 and an outlet cover plate 14 are securely mounted. Inlet cover plate 13 has a circular opening 13a centrally disposed therein which is sized to snugly receive an inlet fitting 16. Outlet cover plate 14, having central opening 14a, is similarly equipped with an outlet fitting 17. Each of the fittings 16 and 17 are adapted to be connected with open ends of a refrigeration suction line so that refrigerant passing therethrough will travel through filter assembly 11 prior to being compressed.

As is best shown in FIGURE 1, a tubular filter element 18, having an outer surface 18a and an inner surface 18b, is fixedly mounted to said casing 12 by opposed mounting brackets 19 and 21, adjacent the inlet and outlet portions of filter assembly 11, respectively. Filter element 18 can be desirably composed of wool felt since this material offers advantageous properties with respect to flow resistance and refrigerant purification.

In the illustrated embodiment, mounting bracket 19 is fixedly secured to casing 12 by means of a collar-like portion 19a, approximately equal to the inside diameter of casing 12. As is shown, collar 19a is fitted between cover plate 13 and casing 12, and cooperates with skirt 19b to prevent both axial and longitudinal movement of bracket 19 in the filter assembly 11.

Skirt 19b tapers radially inwardly as shown at 19c and can be spidered or otherwise equipped with apertures so as to permit the flow of refrigerant therethrough into the annular chamber 22.

Bracket 21, located at the outlet end of casing 12, includes a right angled inner portion 21a, adapted to engage with filter element 18, which tapers into a continuous skirt 21b and then extends radially outwardly into a collar 21c. Bracket collar 21c seats against a gasket 23, desirably composed of asbestos fibre, which in turn seats against a screen 24, sized to fit between the outlet end of casing 12 and cover plate 14.

As shown diagrammatically by the arrows in FIGURE 1, bracket 21, by closing off the outlet end of chamber 22, causes the refrigerant to pass through filter element 18 into chamber 26 and from there through screen 24 into fitting 17.

In accordance with an important aspect of the present invention, bracket 19 is equipped with a heat shield 19d which protects filter element 18 from high temperatures developed adjacent the inlet end of the casing when cover plate 13 is soldered to casing 12. In the illustrated embodiment the heat shield is shown as a continuous open ended skirt surrounding the filter element and having an inner diameter greater than the outer diameter of the filter element so as to not contact the filter element.

The by-pass pressure relief means of the present invention is illustrated in its closed or filtered-flow position in FIGURE 1. As shown, an inlet cap having a generally convex outer surface with respect to the flow of refrigerant entering the filter assembly 11 through conduit 16, directs said refrigerant in a streamline flow fashion through openings in mounting bracket 19 into annular chamber 22. Inlet cap 27 includes an outer annular cap member 28 having a centrally disposed opening 28a and a fixed diameter skirt 28b. The interior diameter of skirt 28b is sized to engage with the outer surface of filter element 18 and in addition, acts to separate bracket 19 from the filter so as to increase the effectiveness of heat shield 19d. An inlet cap 29, having a domed top surface 29a and a skirt 29b which extends radially outwardly to form a rim 29c is adapted to sealingly engage with centrally a disposed opening 28a in cap member 28. A spring retainer component 30, positioned between the inlet end of filter element 18 and cap member 28, is provided with a spring-receiving socket 31 and a plurality of radially extending arms 32. A coil spring 33, sized to fit within skirt 29b of inner cap member 29 and socket 31 of spring retainer 30 serves to bias the inner cap member 29 in sealing engagement with the interior rim of cap member 28.

In accordance with the present invention, the flow of refrigerant, after being directed by inlet cap 27 into chamber 22, flows through filter element 18 into inner chamber 26 and from there into conduit 17. As the flow resistance through the filter element 18 increases, however, there will be a force exerted on inner cap member 29 which, at a predetermined point, will cause inner cap member 29 to move axially inwardly, permitting the refrigerant to flow through opening 28a directly into chamber 26 (See FIGURE 2). In this connection, it is important to note that rim 29c will bottom against arms 32 before spring 33 becomes fully compressed. Accordingly, when the build up of contaminants in filter element 18 become so great so as to substantially impede the flow of refrigerant therethrough, the refrigerant will urge inlet cap 29 inwardly and provide an alternative or by-pass routing of refrigerant without any movement of the filter element 18. This is particularly important since, when these filters become plugged or clogged, any movement thereof will tend to disturb the built-up sludge causing it to be transmitted to the various refrigeration components.

In constructing the filter assembly 11 illustrated in the drawing, the fittings 16 and 17 are soldered to cover plates 13 and 14, respectively (note solder rings 16a, b and 17a, b, in FIGURE 1). Screen 24 is then placed against one end of casing 12 and cover plate 14 fixedly mounted thereover by soldering (note solder ring 34). The gasket 23, mounting bracket 21 and tubular filter 18 are then placed in the casing. Inner cap 27 with the coil spring 33, spring retainer 30 and mounting bracket 19 are then placed on top of the exposed end of filter element 18. Cover plate 13, to which conduit 16 has already been soldered, is fixedly secured to casing 12 by soldering (note solder ring 35). In this connection, it is important to note that the wool felt filter element 18 will be protected by the high temperatures developed during the soldering of cover plate 13 by reason of heat shield 19d.

While the present invention has been shown in a single embodiment, it will be appreciated that various modifications may be made by those skilled in the art without departing from the spirit and scope of the invention. Accordingly, it is to be understood that I wish to embody within the scope of the patent warranted hereon all such modifications and variations as properly come within the scope of the appended claims.

I claim:

1. A refrigerant filter assembly, comprising an elongated sleeve-like casing, an inlet cover plate and an outlet cover plate sealingly secured to opposite end of said casing, means for connecting said inlet and outlet cover plates with open ends of a suction line in a refrigeration system so that the flow of refrigerant through said suction line will enter at said inlet cover plate and exit adjacent said outlet cover plate, a tubular filter element fixedly secured to said casing by first and second mounting brackets, said first mounting bracket being positioned adjacent said inlet cover plate and having apertures formed therein through which said refrigerant can pass, said second mounting bracket being continuous and solid so as to prevent said refrigerant from passing therethrough, a domed inlet cap having an open end sized to extend around the outer surface of said tubular filter element, said domed inlet cap being positioned adjacent said inlet cover plate to direct the flow of refrigerant from said inlet cap through said apertures in said first mounting bracket along the outer surface of said tubular filter element for passage therethrough, said domed inlet cap including an outer annular member fixedly secured to said first mounting bracket, said domed inlet cap also including a centrally disposed inner cap member sized to sealingly engage with the interior rim of said outer annular cap member, said inner cap member being movable along a direction parallel to the flow of incoming refrigerant, spring means biasing said inner cap member in sealing relation with said outer annular cap member, said spring means being adapted to compress to permit the movement of said inner cap member to provide a by-pass flow path for said refrigerant through the opening in said outer annular cap member when the flow resistance through said filter element reaches a predetermined value, and heat shield means including a continuous skirt-like member surrounding in spaced-away relation one end of said filter element adjacent one of said cover plates for protecting said filter element from high temperatures developed at said cover plate.

2. A refrigerant filter assembly, comprising an elongated sleeve-like casing, an inlet cover plate and an outlet cover plate sealingly secured to opposite ends of said casing, means for connecting said inlet and outlet cover plates with open ends of a suction line in a refrigeration system so that the flow of refrigerant through said suction line will enter at said inlet cover plate and exit adjacent said outlet cover plate, a tubular filter element fixedly secured to said casing by first and second mounting brackets, said first mounting bracket being positioned adjacent said inlet cover plate and having apertures formed therein through which said refrigerant can pass, said second mounting bracket being continuous and solid so as to prevent said refrigerant from passing therethrough, an inlet cap having an outer skirt sized to extend around the outer surface of said tubular filter element, said inlet cap being positioned adjacent said inlet cover plate and arranged to direct the flow of refrigerant from said inlet cap through said apertures in said first mounting bracket along the outer surface of said tubular filter element for passage therethrough, said inlet cap including an outer annular member fixedly secured to said first mounting bracket and a centrally disposed inner cap member sized to sealingly engage with the interior rim of said outer annular cap member, said inner cap member being movable with respect to said outer annular cap member, spring means biasing said inner cap member in sealing relation with said outer annular cap member, said spring means being adapted to compress to permit the movement of said inner cap member to provide a by-pass flow path for said refrigerant through the opening in said outer annular cap member when the flow resistance through said filter element reaches a predetermined value, and heat shield means including a continuous skirt-like member surrounding in spaced-away relation one end of said filter element adjacent one of said cover plates for protecting said filter element from high temperatures developed at said cover plate.

References Cited

UNITED STATES PATENTS

| | | | |
|---|---|---|---|
| 1,195,983 | 8/1916 | Farmer | 55—311 |
| 2,226,045 | 12/1940 | Baldwin | 210—456 X |
| 2,360,020 | 10/1944 | Skinner et al. | 210—456 X |
| 2,556,292 | 6/1951 | Newcum | 210—446 X |
| 2,557,557 | 6/1951 | Newcum | 210—446 X |
| 3,064,819 | 11/1962 | Jones | 210—266 |
| 3,090,490 | 5/1963 | Yocum | 210—299 |
| 3,295,680 | 1/1967 | Wilbur | 210—416 X |

REUBEN FRIEDMAN, *Primary Examiner.*

F. SPEAR, *Assistant Examiner.*